United States Patent Office 3,230,194
Patented Jan. 18, 1966

3,230,194
2-(2'-HYDROXY-5'-TERTIARY-OCTYLPHENYL)-BENZOTRIAZOLE AND POLYOLEFINS STABILIZED THEREWITH
Richard J. Boyle, Neshanic, N.J., assignor to American Cyanamid Company, New York, N.Y., a corporation of Maine
No Drawing. Filed Dec. 22, 1961, Ser. No. 161,421
3 Claims. (Cl. 260—45.8)

This invention relates to the provision of the compound 2-(2-hydroxy-5-octylphenyl)benzotriazole. It relates further to the protection of polyolefins against the deteriorative action of ultraviolet light by the inclusion therein of a stabilizing amount of such a benzotriazole derivative.

It has been proposed to stabilize polymeric materials against ultraviolet light deterioration by the use of various types of ultraviolet absorbers. Thus, a recent patent, U.S. 3,004,896, discloses for this purpose 2-phenylbenzotriazole derivatives, especially those having a lower alkyl substituent and also a hydroxy substituent in the ortho position, on the phenyl moiety. A member of this group of derivatives, the compound 2-(2-hydroxy-5-methylphenyl)benzotriazole when incorporated in a polyester resin formulation satisfactorily conferred UV stability to the test sample. Similar tests on nylon gave equally satisfactory results. When the same derivative was incorporated in polyolefinic compositions, the resulting formulation showed disappointingly bad stability. The sample actually deteriorated more rapidly than the unstabilized control sample. Moreover, the test sample commenced to bloom after a relatively short period of time thus showing the incompatibility of the stabilizer with the polyolefin. On the theory that ineffectiveness as a stabilizer was due solely to insufficient solubility of the compound in the polyolefin sample, it was attempted to prepare a compound having improved solubility characteristics. A 2-o-hydroxyphenylbenzotriazole derivative having a higher alkyl radical, i.e., a dodecyl group in the 5-position was chosen for this purpose. Tests showed this compound to have good UV absorption properties. Also it was compatible with the polyolefin substrate. On the other hand, while it provided better protection against UV deterioration than the corresponding 5-methyl analog, the degree of protection in absolute terms left much to be desired. The degree of carbonyl formation and the loss of elongation qualities in polyolefin test samples exposed to UV radiation, was higher than the tolerable limit.

It is an object of this invention to provide an ultraviolet absorber of the benzotriazole type capable of conferring a high degree of long lasting stability to polyolefinic compositions. It is a further object of this invention to provide polyolefinic compositions having a high degree of stability against the deteriorative effects of ultraviolet light.

These and other objects have been accomplished in accordance with the present invention by the provision of the new compound 2-(2-hydroxy-5-octylphenyl)benzotriazole. It has been discovered that this derivative (whether the octyl radical is of the normal, tertiary or other isomeric configuration) is eminently suitable for the UV stabilization of polyolefinic materials, in contrast to the structurally similar prior art derivatives named above.

It is an advantage of this invention that any polyolefinic plastic such as polyethylenes, polypropylenes, polybutylenes and copolymers thereof, may be stabilized by the practice thereof. This is noteworthy since the compound of this invention is not satisfactory for the stabilization of other hydrocarbon polymers such as the polystyrenes.

For most purposes efficient stabilization is obtained by mixing the 2-(2-hydroxy-5-octylphenyl)benzotriazole with the polyolefin in a concentration of about 0.1% on the weight of the polyolefin. However, as little as 0.01% or as much as 5.0% may be effectively used for specialized purposes, as desired. The stabilized polyolefins may be prepared by conventional methods known to the art, such as by mixing a polyolefinic material with the UV stabilizer and then milling and molding the mixture to yield the sheet or article of the desired size and shape.

EXAMPLE 1

2-(2-hydroxy-5-tert-octylphenyl)benzotriazole

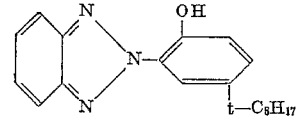

o-Nitroaniline (27.6 g., 0.2 mole) was suspended in a mixture of 50 ml. conc. hydrochloric acid and 500 ml. water. 12 g. of sodium nitrite was added at 10° and the resulting o-nitrobenzenediazonium chloride solution was neutralized with 45 g. sodium acetate.

An emulsion of 21 g. (0.1 mole) p-tert-octylphenol, 20 ml. ethanol, 20 g. sulfonated castor oil and 220 ml. 2% aqueous sodium hydroxide was prepared and added with stirring to the above diazonium chloride solution at 10°. The red azo dye formed, was filtered, dried and suspended in 150 ml. ethanol. 50 g. zinc powder and 150 ml. 15% sodium hydroxide was added and the mixture was refluxed until a green color formed. The zinc was separated by filtration and the filtrate was acidified to give the product 2-(2-hydroxy-5-tert-octylphenyl)benzotriazole. Upon filtration and recrystallization from ethanol pure material was obtained melting at 102–4° C.

The corresponding n-octyl derivative was prepared by substituting p-n-octyl phenol for the p-tert-octylphenol used in the foregoing procedure.

EXAMPLE 2

Ultraviolet absorption tests in polyethylene

The t-octyl compound of Example 1 (0.1% by weight) was milled into low-density polyethylene and 10-mil sheets were molded. The sheets were exposed outdoors for 80 days; carbonyl formation and percent ultimate elongation were determined. Results were as follows:

|  | Percent C=O | Percent Ultimate Elongation |
|---|---|---|
| Unstabilized (control) | 0.259 | 70 |
| 2-(2-Hydroxy-5-methylphenyl)benzotriazole | 0.283 | 52 |
| 2-(2-Hydroxy-5-tert-octylphenyl)benzotriazole | 0.098 | 706 |
| 2-(2-Hydroxy-5-n-dodecylphenyl)benzotriazole | 0.197 | 432 |

From these results it is noted that polyethylene was actually made less stable than the control by the incorporation of 2-(2-hydroxy-5-methylphenyl)benzotriazole whereas much greater stability was obtained with 2-(2-hydroxy-5-tert-octylphenyl)benzotriazole as with the corresponding 5-n-dodecyl derivative.

Similar results are obtained when polypropylene or polybutylene is substituted in the foregoing example.

I claim:
1. 2-(2-hydroxy-5-t-octylphenyl)benzotriazole.
2. A composition of matter stabilized against the deteriorative effects of ultraviolet light comprising a polymer of an alpha-mono-olefin of 2–4 carbon atoms and from 0.01 to 5.0 weight percent of 2-(2-hydroxy-5-t-octylphenyl)benzotriazole.
3. The composition of claim 2 wherein the polymer is polyethylene.

References Cited by the Examiner
UNITED STATES PATENTS

| | | | |
|---|---|---|---|
| 3,004,896 | 10/1961 | Heller et al. | 260—45.8 |
| 3,018,269 | 1/1962 | Bruno | 260—45.8 |
| 3,074,910 | 1/1963 | Dickson | 260—45.75 |

LEON J. BERCOVITZ, *Primary Examiner.*

MILTON STERMAN, JOHN W. BEHRINGER, HOSEA E. TAYLOR, *Assistant Examiners.*